United States Patent [19]

Weber

[11] Patent Number: 4,979,222

[45] Date of Patent: Dec. 18, 1990

[54] METHOD FOR PRODUCING A THIRD IMAGE THAT CLARIFIES THE DIFFERENCES BETWEEN TWO IMAGES WHICH ARE ALLOCATED TO ONE ANOTHER

[76] Inventor: Joerg Weber, Auf dem Muehlenacker 40, 5030 Huerth, Fed. Rep. of Germany

[21] Appl. No.: 483,085

[22] Filed: Feb. 21, 1990

[30] Foreign Application Priority Data

Feb. 21, 1989 [DE] Fed. Rep. of Germany ....... 3905234

[51] Int. Cl.$^5$ .............................................. G06K 9/00
[52] U.S. Cl. .......................................... 382/6; 382/27; 382/30; 382/34
[58] Field of Search ..................... 382/6, 1, 22, 27, 30, 382/34, 4

[56] References Cited

U.S. PATENT DOCUMENTS 4,164,728 8/1979 Marsh ................................... 382/30
4,541,113 9/1985 Seufert et al. .......................... 382/4

*Primary Examiner*—Leo H. Boudreau
*Assistant Examiner*—Steven P. Fallon
*Attorney, Agent, or Firm*—Hill, Van Santen, Steadman & Simpson

[57] ABSTRACT

A method for producing a third image that clarifies the differences between two images which are allocated to one another is proposed in which the regions in which a parameter value of the image signals of the first image is greater than the parameter value of the image signals of the second image are reproduced by strips extending in a first direction and those regions in which the parameter value of the image signals of the second image is greater than the parameter value of the image signals of the first image are reproduced by strips extending in a second direction that extends at a right angle relative to the first direction, and the strips alternately correspond to the image signals of the first image and to image signals of the second image.

2 Claims, 4 Drawing Sheets

Fig.1

| $1_{00}$ $1_{01}$ | $1_{00}$ $1_{01}$ | $1_{00}$ $1_{01}$ |
| $1_{10}$ $1_{11}$ | $1_{10}$ $1_{11}$ | $1_{10}$ $1_{11}$ |
|---|---|---|
| $1_{00}$ $1_{01}$ | $1_{00}$ $1_{01}$ | $1_{00}$ $1_{01}$ |
| $1_{10}$ $1_{11}$ | $1_{10}$ $1_{11}$ | $1_{10}$ $1_{11}$ |
| $1_{00}$ $1_{01}$ | $1_{00}$ $1_{01}$ | $1_{00}$ $1_{01}$ |
| $1_{10}$ $1_{11}$ | $1_{10}$ $1_{11}$ | $1_{10}$ $1_{11}$ |

Fig.2

| $2_{00}$ $2_{01}$ | $2_{00}$ $2_{01}$ | $2_{00}$ $2_{01}$ |
| $2_{10}$ $2_{11}$ | $2_{10}$ $2_{11}$ | $2_{10}$ $2_{11}$ |
|---|---|---|
| $2_{00}$ $2_{01}$ | $2_{00}$ $2_{01}$ | $2_{00}$ $2_{01}$ |
| $2_{10}$ $2_{11}$ | $2_{10}$ $2_{11}$ | $2_{10}$ $2_{11}$ |
| $2_{00}$ $2_{01}$ | $2_{00}$ $2_{01}$ | $2_{00}$ $2_{01}$ |
| $2_{10}$ $2_{11}$ | $2_{10}$ $2_{11}$ | $2_{10}$ $2_{11}$ |

| $1_{00}$ $2_{01}$ | $1_{00}$ $2_{01}$ | $1_{00}$ $2_{01}$ |
| $1_{10}$ $2_{11}$ | $1_{10}$ $2_{11}$ | $1_{10}$ $2_{11}$ |
|---|---|---|
| $1_{00}$ $2_{01}$ | $1_{00}$ $2_{01}$ | $1_{00}$ $2_{01}$ |
| $1_{10}$ $2_{11}$ | $1_{10}$ $2_{11}$ | $1_{10}$ $2_{11}$ |
| $1_{00}$ $2_{01}$ | $1_{00}$ $2_{01}$ | $1_{00}$ $2_{01}$ |
| $1_{10}$ $2_{11}$ | $1_{10}$ $2_{11}$ | $1_{10}$ $2_{11}$ |

| $1_{00}$ $1_{01}$ | $1_{00}$ $1_{01}$ | $1_{00}$ $1_{01}$ |
| $2_{10}$ $2_{11}$ | $2_{10}$ $2_{11}$ | $2_{10}$ $2_{11}$ |
|---|---|---|
| $1_{00}$ $1_{01}$ | $1_{00}$ $1_{01}$ | $1_{00}$ $1_{01}$ |
| $2_{10}$ $2_{11}$ | $2_{10}$ $2_{11}$ | $2_{10}$ $2_{11}$ |
| $1_{00}$ $1_{01}$ | $1_{00}$ $1_{01}$ | $1_{00}$ $1_{01}$ |
| $2_{10}$ $2_{11}$ | $2_{10}$ $2_{11}$ | $2_{10}$ $2_{11}$ |

METHOD FOR PRODUCING A THIRD IMAGE THAT CLARIFIES THE DIFFERENCES BETWEEN TWO IMAGES WHICH ARE ALLOCATED TO ONE ANOTHER

BACKGROUND OF THE INVENTION

1. Field of the Invention

The present invention relates to producing a third image that clarifies the differences between two images which are allocated to one another.

2. Description of the Prior Art

Two images must be compared to one another in a number of areas of technology, particularly in medical technology. This is required, in particular, when a course of a development process is to be recognized by comparing two images of the same subject which are produced in succession.

Purely visual comparison of the two images leads to only unsatisfactory results.

It will be obvious in and of itself for producing a third image that clarifies the differences between two images which are allocated to one another to subtract those image signals of the two first images that correspond to one another from one another and to produce the third image from the difference signals. Such a procedure, however, has the disadvantage that such a third image no longer contains the basic information.

SUMMARY OF THE INVENTION

It is therefore the object of the present invention to provide a method for producing a third image that clarifies the differences between two images which are allocated to one another and wherein the different regions of the two images are clarified upon preservation of the basic information.

The above object is achieved, according to the present invention, by acquiring first image signals corresponding to the picture elements of the first image, by acquiring second image signals corresponding to the picture elements of the second image, and by acquiring third image signals corresponding to the picture elements of the third image by forming matrices composed of 2×2 image signals of mutually-adjacent picture elements of the first image, forming matrices composed of 2×2 image signals of mutually-adjacent picture elements of the second image, forming matrices composed of 2×2 image signals of mutually-adjacent picture elements of the third image by allocating the image signals of the first picture elements of the matrices of the first image to the corresponding picture elements of the third image, allocating the image signals of second picture elements of the matrices of the second image lying diagonally opposite the first picture elements to the corresponding picture elements of the third image, allocating the image signals of third picture elements of the matrices of the first or the second image that are greater with respect to a parameter to the corresponding picture elements of the third image, and allocating fourth picture signals of the matrices of the first or of the second image line diagonally opposite the third picture elements that are smaller with respect to a parameter to the corresponding picture elements of the third image, as a result whereof the regions wherein the parameter value of the image signals of the matrices of the first image is greater than the parameter value of the image signals of the matrices of the second image are reproduced in the reproduced image by strips extending in a first direction and the regions wherein the parameter value of the image signals of the second image is greater than the parameter value of the image signals of the first image are reproduced in the reproduced image by strips extending in a second direction that extends at a right angle relative to the first direction, and the strips correspond in alternation to the image signals of the first image and to the image signals of the second image.

The parameter value of the image signals on the basis whereof the allocation occurs preferably is the brightness.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic illustration of an excerpt from a first image composed of nine matrices;

FIG. 2 is a schematic illustration of an excerpt of a second image composed of nine matrices;

FIG. 3 is a schematic illustration of a corresponding section from a third image given the assumption that the parameter value of the second image signals is greater than the parameter value of the corresponding image signals of the first image;

FIG. 4 is a schematic illustration corresponding to FIG. 3 given the assumption that the parameter value of the first image signals is greater than the parameter value of the corresponding image signals of the second image;

DESCRIPTION OF THE PREFERRED EMBODIMENTS

Figure 5:
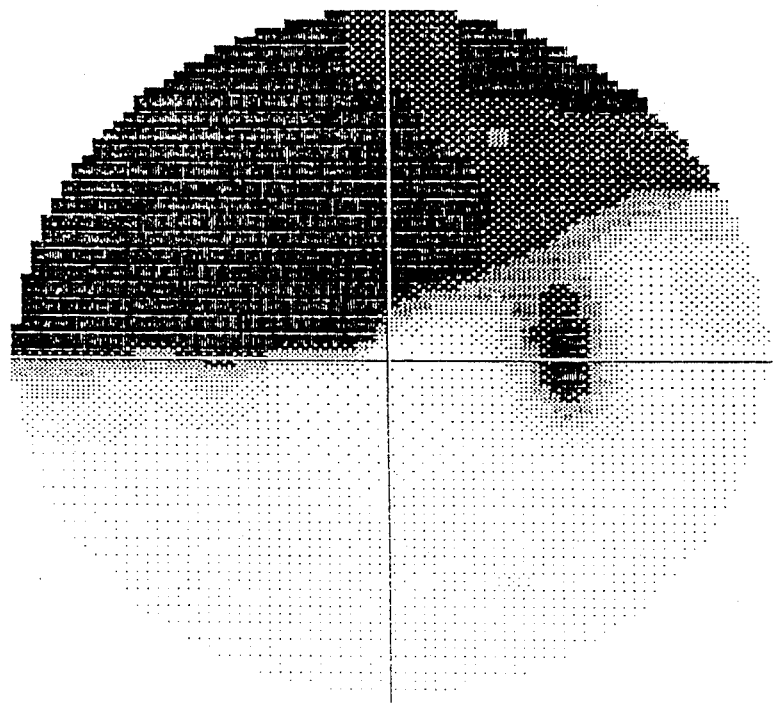
FIG. 5 is an illustration of the first image.

The illustrations of FIGS. 1 and 2 reproduce nine matrices, each of which is composed of 2×2 picture elements of a first or, respectively, of a second image; FIGS. 3 and 4 illustrate the corresponding image portions of a third image, whereby it is assumed in FIG. 3 that the image signals in the second image are greater with respect to a defined parameter; and FIG. 4, by contrast, assumes that the image signals with respect to the parameter in this portion are greater in image 1.

The third image (FIGS. 3 and 4) is formed in that the image signal of the corresponding first image is allocated to a first picture element (00) in every matrix. A second picture element (11) lying diagonally opposite the first picture element, by contrast, is allocated in each case to the image signal of the corresponding picture element of the second image.

The allocation with respect to a third picture element of the matrices occurs by comparing the parameter of the values of the corresponding image signals of the first or, respectively, of the second image, and when: the parameter value of the first image is greater than the corresponding parameter value of this picture element of the second image, the image signal of the corresponding picture element (01) of the first image is allocated to the third picture element (01); by contrast, the picture signal value of the second image is greater, than the corresponding image signal of the second image is allocated to this picture element. The analogous case occurs with respect to the fourth picture element (10) of the matrix lying opposite the third picture element.

FIGS. 3 and 4 already show that vertically-extending strips arise in image portions wherein the parameter value of the image signals of mutually-corresponding picture elements of the second image is greater than that of the first image, but that horizontal strips arise in the opposite case.

Figure 6:
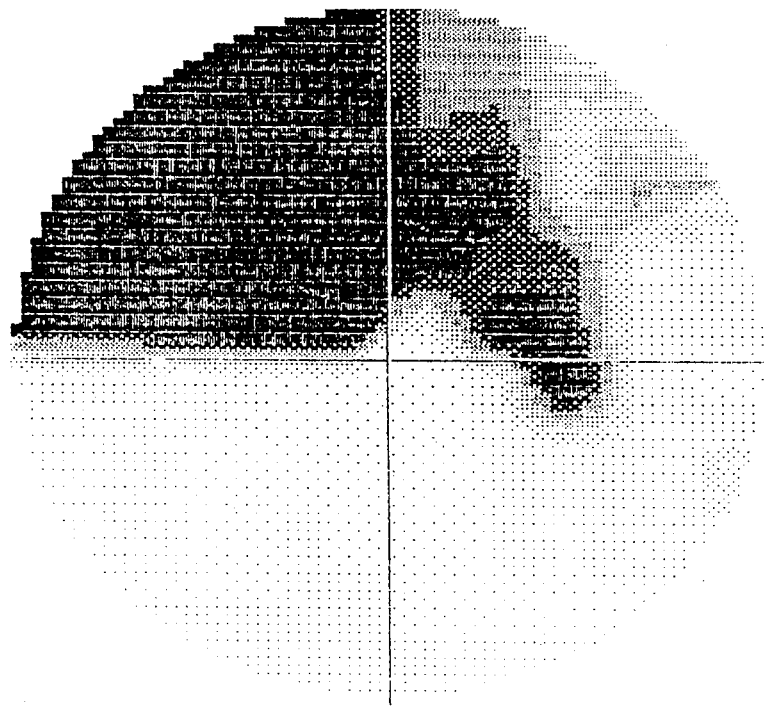
FIG. 6 is an illustration of a second image.
Figure 7:
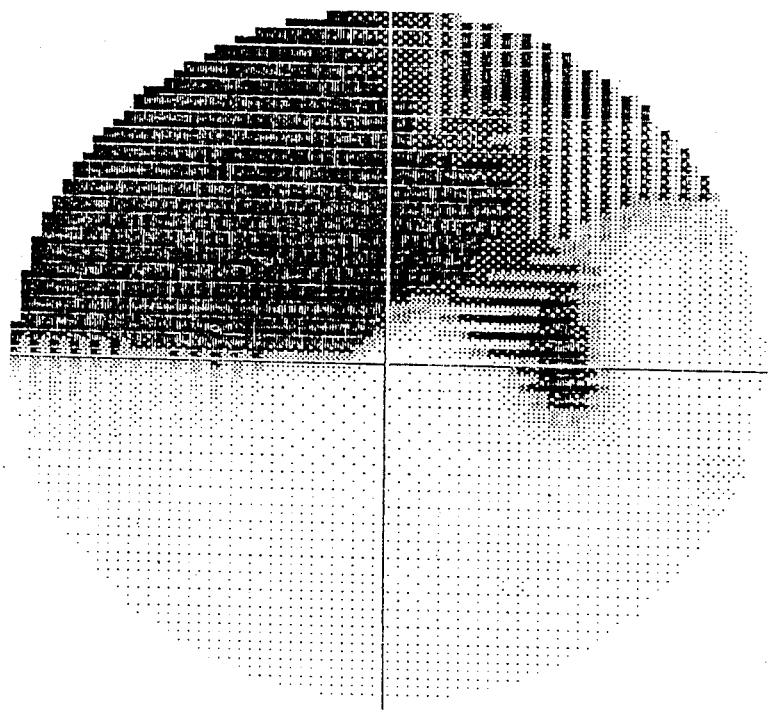
FIG. 7 is an illustration of a third image constructed in accordance with the present invention.

FIG. 5 illustrates a first image and FIG. 6 illustrates a second image, whereby both images were made at the same subject at different times. FIG. 7 shows the third image that then is derived given application of the method of the present invention, whereby the brightness is selected as the parameter value such that in those regions in which the brightness of the second image is greater than in the corresponding regions of the first image, the third image exists as vertical strips, whereby neighboring strips reproduce the image signals of the first or, respectively, second image in alternation. In regions in which the brightness of the first image is greater than that of the second image, by contrast, horizontally-extending strips arise, whereby neighboring strips again reproduce the image signals in the first or, respectively, the second image in alternation.

The third image (FIG. 7) that is derived therefore still has the basic information concerning the original image signals of the first image and of the second image and, in addition, enables a direct evaluation of the brightness differences between the first and second images on the basis of the vertical or, respectively, horizontal strips.

It is self-evident that the first image and the second image need not be physically present. On the contrary, it is also adequate when the first image and the second image are merely present as digital image signals and the third image is directly formed from these image signals.

The area of application of the method proposed herein is extremely great. In addition to progress representations, for example, in medical technology, a portrayal of the motion of two successive images comes into consideration.

The brightness was selected as the parameter value here only by way of example; other parameters of the image signals can also come into consideration, whereby these can then involve parameter values that are not portrayed in the image and/or that are mathematically calculated from one or more image signals.

Each of the picture elements can, in turn, be composed of a plurality of pixels, i. e. of smallest picture units.

It is also self-evident that the third image produced in accordance with the method proposed herein can be processed with a third image produced from two different first images given application of the method proposed herein.

Both individually as well as in arbitrary combinations, the features of the invention disclosed herein can be critical for the realization of the various embodiments of the invention.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for producing a third image that clarifies the differences between two images which are allocated to one another, comprising the steps of:

acquiring first image signals corresponding to the picture elements of a first image;

acquiring second image signals corresponding to the picture elements of a second image;

acquiring third image signals corresponding to the picture elements of a third image by forming matrices composed of $2 \times 2$ image signals of mutually-adjacent picture elements ($1_{00}$, $1_{01}$, $1_{10}$, $1_{11}$) of the first image, forming matrices composed of $2 \times 2$ image signals of mutually-adjacent picture elements ($2_{00}$, $2_{01}$, $2_{10}$, $2_{11}$) of the second image;

forming matrices composed of $2 \times 2$ image signals of mutually-adjacent picture elements of the third image by allocating the image signals of the first picture elements ($1_{00}$) of the matrices of the first image to the corresponding picture elements of the third image;

allocating the image signals of the second picture elements ($2_{11}$) of the matrices of the second image lying diagonally opposite the first picture elements to the corresponding picture elements of the third image;

allocating the image signals of third picture elements ($1_{01}$ or, respectively, $2_{01}$) of the matrices of the first and of the second image that are greater with respect to a predetermined parameter to the corresponding picture elements of the third image; and allocating the image signals of fourth picture elements ($1_{10}$, or, respectively, $2_{10}$) of the matrices of the first image and of the second image lying diagonally opposite one another that are smaller than the image signals of the third picture elements with respect to a predetermined parameter to the corresponding picture elements of the third image, whereby the regions in which the parameter value of the image signals of the first image is greater than the parameter value of the image signals of the second image are produced in the reproduced image by strips extending in a first direction and the regions in which the parameter value of the image signals of the second image is greater than the parameter value of the image signals of the first image are reproduced in the reproduced image by strips extending in a second direction that extends at a right angle relative to the first direction, and the strips alternately correspond to the image signals of the first image and to the image signals of the second image.

2. The method of claim 1, and further defined by the step of:

selecting and applying brightness as the parameter value of the image signals in the steps of allocating the image signals of the third picture elements and the image signals of the fourth picture elements.

* * * * *